United States Patent Office.

F. G. HARRIS, OF WILLSBOROUGH, NEW YORK.

Letters Patent No. 70,559, dated November 5, 1867.

---

IMPROVED COMPOSITION FOR TEMPERING STEEL.

---

The Schedule referred to in these Letters Patent and making part of the same.

---

TO ALL WHOM IT MAY CONCERN:

Be it known that I, F. G. HARRIS, of Willsborough, Essex county, New York, have invented a new and improved Composition for Tempering Steel; and I do hereby declare that the following is a full, clear, and exact description thereof, which will enable others skilled in the art to make and use the same.

My invention has for its object to furnish an improved composition for tempering steel, which composition will give it a better temper, greater toughness, elasticity, and hardness, without brittleness, than any of the compounds now in use for this purpose; and it consists in the composition formed of the ingredients combined with each other in the proportions hereinafter described and set forth.

In preparing this composition I take and mix together one gallon of lard oil, two ounces of gum-arabic, one ounce of resin, two ounces of saltpetre, one ounce of salt, and thirty drops of acetic acid, which composition forms a bath in which the articles to be tempered are placed in the ordinary manner.

The bath is prepared for use as follows: I take one quart of lard oil, into which I put two ounces of gum arabic and two ounces of saltpetre, thoroughly pulverized and mixed together. The oil, gum, and saltpetre are then heated in an iron kettle for fifteen minutes over a slow fire. I then add the remainder of the ingredients, and the bath is ready for use. This composition gives the very best temper to edge tools, and in tempering all kinds of springs it gives them a toughness and elasticity never before obtained. The lard oil, gum-arabic, and resin give to the steel a superior hardness and toughness, the saltpetre and salt give it temper and elasticity, and the acetic acid causes the metal to come from the bath clear and beautiful. The composition, while giving to the metal hardness, toughness, elasticity, and temper, never gives it brittleness.

Having thus described my invention, what I claim as new, and desire to secure by Letters Patent, is—

The composition formed of the ingredients combined with each other in the proportions herein described. and for the purpose set forth.

The above specification of my invention signed by me this 17th day of September, 1867.

F. G. HARRIS.

Witnesses:
WM. F. McNAMARA,
JAMES T. GRAHAM.